United States Patent [19]

Benham et al.

[11] 3,970,792
[45] July 20, 1976

[54] ADJUSTABLE MOUNTING STRUCTURE FOR VIDEO TELEPHONE UNIT

[75] Inventors: Edward Edmund Benham, Greenwich; Walter A. Menn, Stamford, both of Conn.; Douglas M. Spranger, Brooklyn; Malcolm J. Brookes, New York, both of N.Y.

[73] Assignee: International Telephone and Telegraph Corporation, New York, N.Y.

[22] Filed: Feb. 18, 1975

[21] Appl. No.: 550,844

[52] U.S. Cl. .............................. 179/2 TV; 248/183
[51] Int. Cl.² ......................................... H04M 1/04
[58] Field of Search ................ 179/2 TV, 146, 148, 179/147; 248/183, 349, 397, 425

[56] References Cited
UNITED STATES PATENTS

| | | |
|---|---|---|
| 2,512,933 | 6/1950 | Hampton et al. .................... 248/349 |
| 2,796,226 | 6/1957 | Dalton et al. ........................ 248/183 |
| 2,893,674 | 7/1959 | Monaco ............................... 248/183 |
| 3,353,776 | 11/1967 | Clemens ............................. 248/183 |
| 3,712,571 | 1/1973 | Miller et al. ........................ 248/183 |

*Primary Examiner*—Kathleen H. Claffy
*Assistant Examiner*—Gerald L. Brigance
*Attorney, Agent, or Firm*—James B. Raden; Marvin M. Chaban

[57] ABSTRACT

Disclosed is a swivel mounting structure for a videotelephone unit. The mounting structure allows the unit to be readily rotated and inclined or be moved with a combination of both movements. The structure will maintain the unit in the position to which it is set by either the friction provided by mechanical locking members or by having the center of gravity of the unit positioned above the center of a pair of spaced rocker members riding within a cylindrical opening.

6 Claims, 6 Drawing Figures

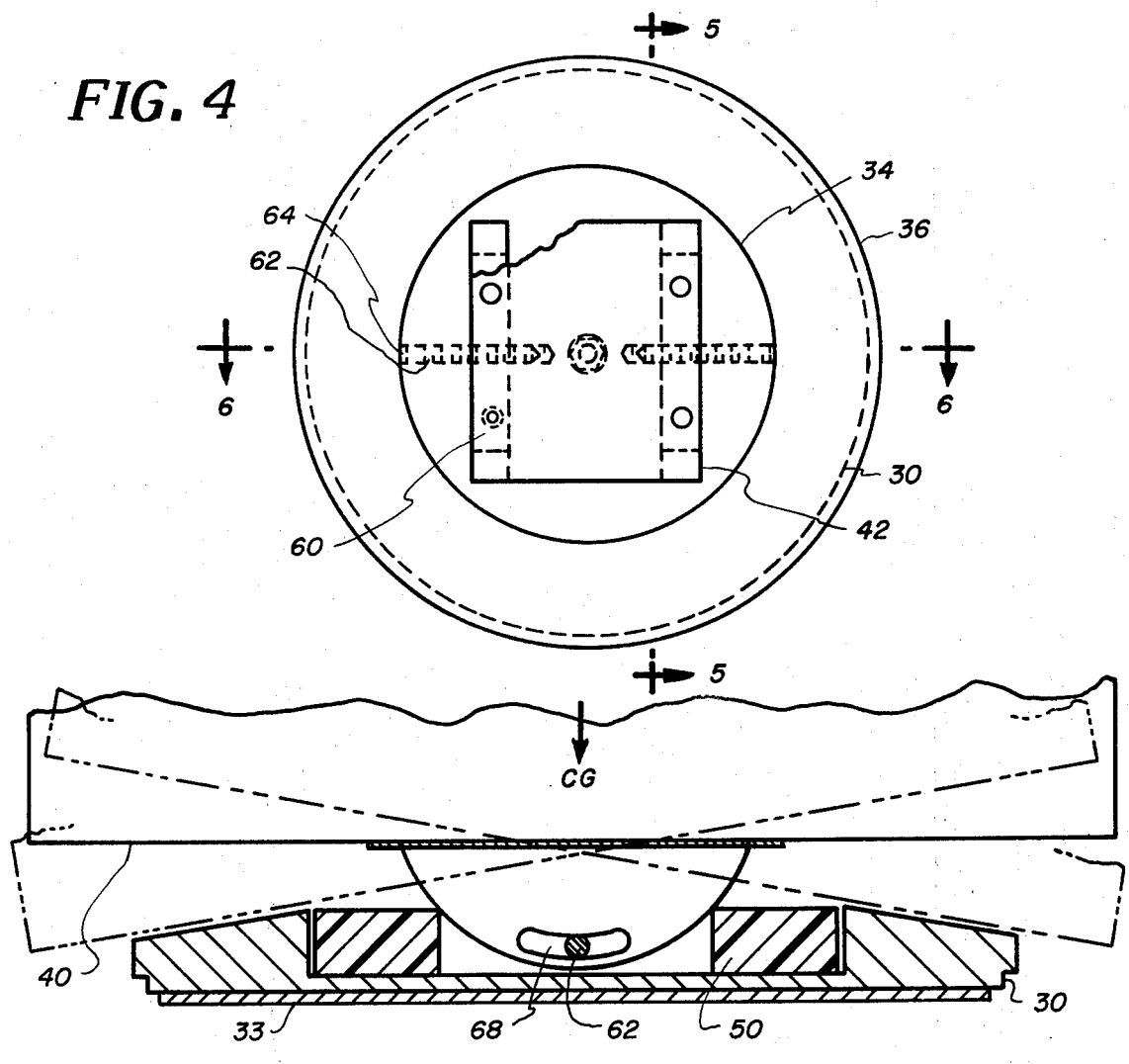
FIG. 4
FIG. 5
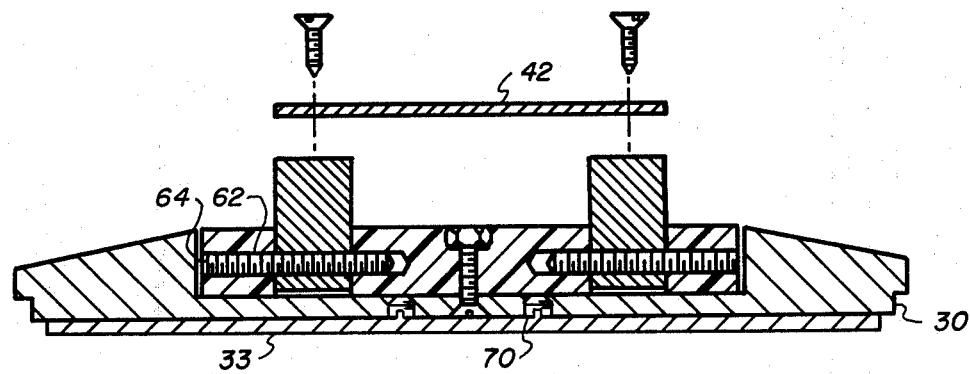
FIG. 6

ADJUSTABLE MOUNTING STRUCTURE FOR VIDEO TELEPHONE UNIT

CROSS REFERENCE TO RELATED APPLICATION

Filed of even date herewith is a design patent application with inventors E. Benham, W. Menn, D. Spranger and M. Brookes for Design for Video Telephone Terminal Unit of the type which may be applied to our invention.

BACKGROUND OF THE INVENTION

Video telephone terminals of the types known at the present time, such as the "Picturephone" sold and used by the Bell System generally mount on a ring base with a stationary central pedestal shaft pivotally secured to the underside of the terminal housing. Adjusting screws or members allow the housing to be tilted angularly and a pivot allows the unit to be rotated about the stationary shaft. These adjustments are necessary to allow the camera member to be focused on the user and to allow the viewing screen and monitor screen, if any, to be viewed by the user. Other known terminals of this type employ a base with a stationary pedestal shaft extending up to the housing mounting hardware with pivot pins, locking screws and the like.

SUMMARY OF THE INVENTION

The present invention relates to an adjustable mounting base for a video telephone terminal unit which allows the unit to be rotated or swiveled readily and be inclined or tilted readily by manual movement. To provide this degree of movement, semi-circular rocker members are mounted on the underside of the housing. These rocker members ride within a rotatable insert in a stationary base to enable rotation of the housing and are pivotal relative to the insert to provide the tilt or housing face inclining movement.

In one form, locking members in a ring within the insert engage walls of a cylindrical cavity in the mounting to hold the housing in a rotary sense, and these locking members ride within arcuate slots in the rockers to limit the inclination of the housing and to hold the housing at the angle of inclination in which it is set.

In a second embodiment, the rockers are symmetrically positioned beneath the center of gravity of the housing so that the housing will generally rest in the position in which it is set both in a rotary sense and in an inclined sense.

It is therefore an object of the invention to provide an improved readily adjustable, mounting base for a combined video screen, video camera unit.

It is a further object of the invention to provide a mounting structure for a desk mounted, viewing screen housing which allows the housing to be readily rotated and inclined manually with infinite adjustments in both senses.

It is a still further object of the invention to provide an improved desk-mounted visual screen terminal which mounts on spaced rocker members constrained to arcuate sliding movement relative to an insert member in a mounting base, the insert being constrained to rotary motion relative to the mounting base.

It is a still further object of the invention to provide a mounting pedestal for a video telephone terminal which allows ready adjustment of the housing face in both the swivel and tilt directions and which holds in a position for both swivel and tilt once set.

BRIEF DESCRIPTION OF THE DRAWINGS

FIG. 4 is a plan view of a mounting base employing our invention and using apparatus for locking a position of the housing once set;

FIG. 5 is a sectional view taken along line 5—5 of FIG. 4; and

FIG. 6 is a sectional view, partially exploded in form, taken along line 6—6 of FIG. 4.

DETAILED DESCRIPTION OF THE DRAWINGS

Figure 1:
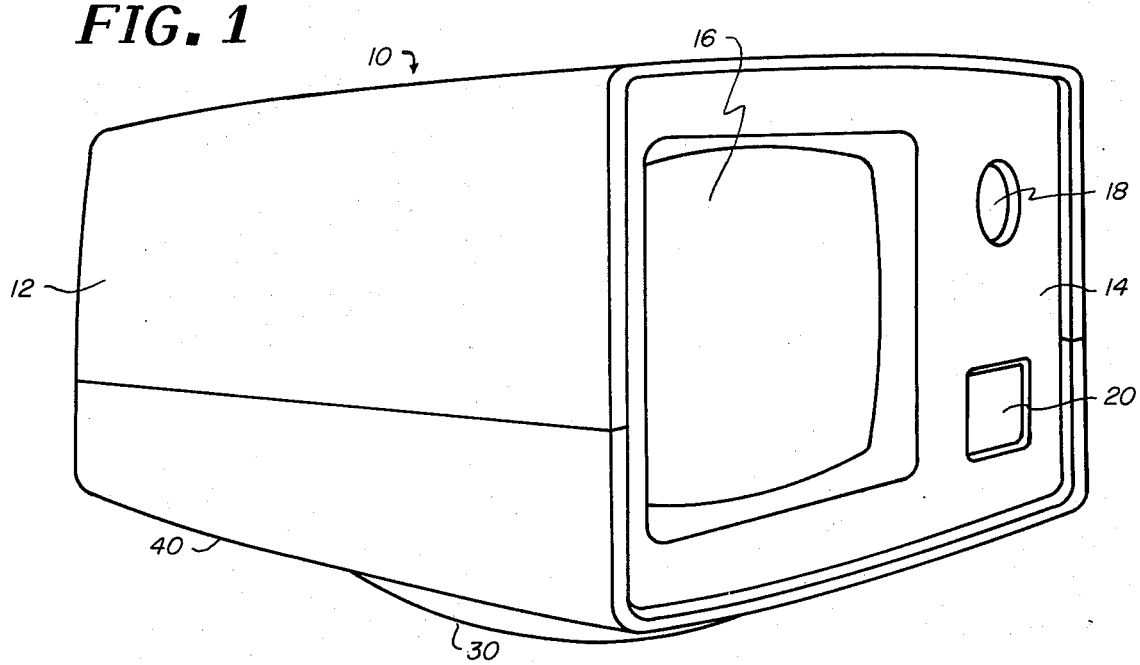
FIG. 1 is a front view in perspective of a video-telephone unit mounted on a mounting base using the present invention.

In FIG. 1, we show a video telephone terminal unit 10. The unit may be of any known design but preferably is of the type shown by the related co-pending application noted previously. The unit 10 as disclosed herein has a comparatively low profile housing 12 with its front face 14 including a video screen 16, a camera 18, and a playback or mounting screen 20 for the picture taken by camera 18. The internal components of the video telephone terminal are outside the scope of this invention and may use any conventional, suitable video equipment fitted within a suitable enclosing housing 12.

The terminal unit is designed to rest on a desk or other suitable horizontal surface within mounting base 30 allowing rotation of the terminal relative to the base and inclination of the front or viewing face 14, as desired.

It is, of course, important that the terminal viewing screens and camera be capable of being positioned freely in a rotary sense and in inclined sense to position the front face properly relative to the viewer. When a conference is occurring, it is very helpful if the terminal can be capable of being moved easily to align the active conferees with the camera as they speak and remain in the position to which it is set. The base 30 allows this freedom in positioning. The base construction allows infinite settings in a rotary sense and in an inclined sense within the tilt limits of the terminal.

Figure 2:
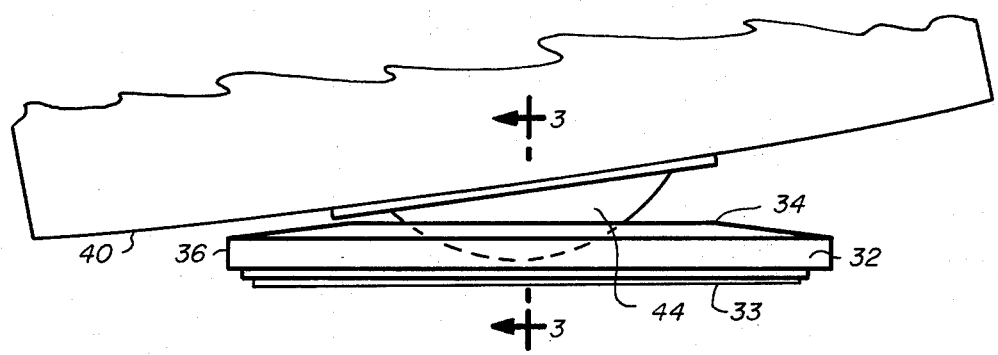
FIG. 2 is a side view in elevation of the unit and mounting base of FIG. 1 with the video telephone unit broken away.
Figure 3:
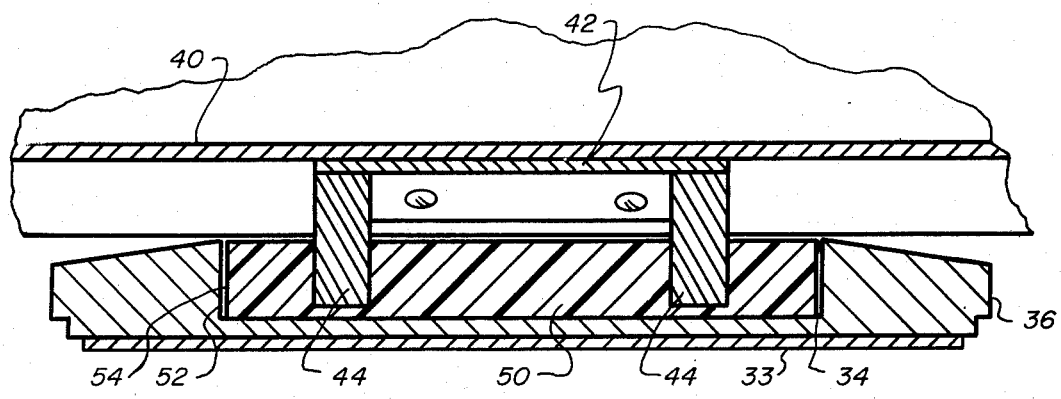
FIG. 3 is a sectional view of a preferred embodiment of the invention viewed along lines 3—3 of FIG. 2.

In FIGS. 2 and 3, we show in greater detail a simpler form of base 30. The base 30 includes an outer circular mounting pedestal 32 with a flat bottom surface adapted to rest on a desk or table surface in a conventional manner and to which is affixed an anti-skid member 33 between the base of the unit and the desk. This member may preferably be a 1/8 inch thick, circular rubber pad. The pad also acts to protect the surface, upon which the base is standing, from being scratched. The pedestal with its bottom surface should be sufficiently large to provide structural stability for the terminal in a conventional manner. The upper surface of the pedestal 32 is inclined frusto-conically outwardly and downwardly from a central annular ridge 34 to an outer peripheral edge 36 to allow maximum tilt of the viewer without an inordinate increase in thickness of the rockers which would otherwise be necessary to provide the appropriate clearances between viewer and base. Edge 36 may assume any aesthetically desirable shape. We have found that for a terminal unit of approximately 12 inches in length, approximately 10 inches in width and approximtely 8 inches in front face height, weighing approximately 30 pounds, a pedestal with a circular mounting surface of about 8 inches in diameter has been found to provide sufficient support for the terminal.

Affixed suitably to the underside 40 of the housing 12 is a flat, rectangular support plate 42 of suitable metal or the like. The support plate serves as the mounting medium for two spaced apart rocker members 44. These members 44 comprise essentially identical circular segments whose flat side is secured rigidly by mounting bolts or the like to the underside of the mounting plate 42. For aesthetic purposes, both the base pedestal outer surface and the rockers may be plated with chrome on the metallic base metal of the pedestal and rocker members. The members 44 are parallel to one another and of like angular extent. As shown, the members are parallel to the housing sides and are preferably located approximately under the housing.

A swivel insert 50 having an outer cylindrical surface 54 is fitted and rides within a cylindrical cavity 52 in the pedestal 30. The insert may be of nylon, Teflon or similar material which will allow it to be swiveled freely in a rotary sense within the metal cavity 52. Preferably as shown, the base cavity is cylindrical but a semicircular cavity with complementarily shaped insert could also be used.

The swivel insert 50, as mentioned, has a generally vertically disposed cylindrical surface 54 mating within the pedestal cavity defined by the central annular ridge 34. The insert has two rectangular, spaced apart recesses 60 in its upper surface. The longitudinal extent and lateral positioning recesses should be centered on the insert, laterally symmetrically about the center thereof. These recesses are sized to receive the rocker members in what may be a free to medium fit.

The ends of the recesses form opposed parallel shoulders for engaging the arcuate surfaces of the rockers 44 and to hold the housing at a set inclination angle by this engagement.

The recesses 60 as mentioned are parallel and each is rectangular in cross section extent and depth. In this way, the rockers ride on and engage the opposed shoulders to enable the ready inclination of the housing.

Alternatively, the base of the recesses could be curved complementarily to the rockers to receive the rockers. By providing edged shoulders for engaging the rockers, the insert shoulders will hold the angle of inclination of the housing, once set. Further, by mounting the rockers symmetrically below and equidistant from the projection of the center of gravity of the housing with the projection being along the common center line of the rockers, the housing will tend to remain in a position, once set manually. In this way, the gravity forces acting on the rockers and base will be balanced in any position in which the housing is set so the position will be held by the natural forces acting on the rockers, insert and base.

In FIGS. 4–6, we show apparatus for more positively holding the rotary or swivel position and the tilt position of the housing. Opposite screw bores 60 are suitably drilled or formed horizontally and threaded to receive suitably threaded studs 62. These studs may be metal or nylon, but preferably are nylon throughout. If metal studs are used, they should have a nylon rod affixed to the head end 64. The rockers are suitably slotted as indicated by arcuate slots 68 (FIG. 5) to allow the studs to pass therethrough between the outer insert section and the section between the rockers. The studs in slot arrangement allow impeded movement of the rockers relative to the studs. The slots normally would be symmetrical about a preferred inclination angle to allow movement of the rocker in both directions from the preferred inclination. The head end rod 64 is positioned to protrude slightly from the insert and provide a light holding force against the pedestal cavity wall to hold the insert relative to the pedestal against rotary movement. Further, the diameter of the studs within the slots may aid in providing a tight fit to enable a better holding action in the inclined sense.

Set screw 70 having nylon tips are threaded through the pedestal to intrude into the pedestal cavity and impede the free movement of the insert in the rotary sense. These set screws will assist in more positively holding the insert in a position in which it has been set.

By the construction shown, the terminal unit housing may be swiveled and tilted to any one of an infinite number of settings merely by manual pressure on the housing. The housing will remain in the position to which set without the need for locking members of any kind.

We claim:

1. An adjustable mounting base for a video telephone terminal comprised of an enlarged housing having a viewing face in one side thereof, said base being adapted to rest on a generally horizontal surface, the base including a pedestal having an enlarged surface adapted to rest on the horizontal surface, a recess in said central portion of said pedestal, said recess having a circular periphery, an insert member fitted in said recess, said insert member including a basal portion mating with said recess to allow rotation of said insert member relative to said base, a socket of rectangular cross section in said insert member, said socket terminating in opposed shoulders at the extreme ends of said socket, a rocker member including an arcuate lower wall, means mounting said rocker member to the underside of said housing with the arcuate wall extending downwardly therefrom, said rocker member resting in said socket with the arcuate wall of said member engaging the shoulders of said socket to enable manually settable inclination of the viewing face of said housing, said rocker to shoulder engagement frictionally holding said terminal in an inclination and said insert member enabling rotation of said housing viewing face.

2. A mounting base as claimed in claim 1, wherein there is a second rocker member essentially identical in shape to said first mentioned rocker member, said second rocker member affixed to said housing parallel to the first mentioned rocker member, and there is a second socket in said insert member parallel to said first socket, and each of said sockets includes a lateral shoulder at each end thereof for mating with the arcuate wall of both said rocker members to hold said viewing face in an inclined position to which set.

3. An adjustable mounting structure for a video telephone terminal allowing rotary and inclination-angle adjustment of an enlarged terminal housing with said terminal adapted to rest on a generally horizontal surface, said mounting structure including a pedestal having a flat base adapted to rest on the horizontal surface, a circular walled recess in said pedestal, a circular walled insert member fitted in said recess and rotatable therein, a pair of parallel spaced openings of rectangular cross section inset into said rotatable member with raised horizontal surface edges at the extreme ends of said openings, a pair of essentially identical rocker members secured to one face of said housing with each rocker member having a circular segmental face parallel to and spaced from the like face of the other rocker member, said rocker members resting in said opening, the segmental faces of said members engaging raised edges in a frictional grip of said insert member to enable manual tilting of the front face of said terminal housing and for holding said housing in a tilt position.

4. A mounting structure as claimed in claim 3, wherein each said rocker member includes a flat mounting face for securement to said housing, and means for affixing said members to said housing with the center of gravity of said housing above a point midway between said rocker members on a line joining the center of the flat mounting faces.

5. A mounting structure as claimed in claim 3, wherein there is an arcuate slot in one of said rocker members parallel to the segmental face thereof, and a holding rod in said insert mating with said slot for holding the housing at a position to which tilted.

6. A mounting structure as claimed in claim 5, wherein there are threaded studs engaging threaded bores in said insert member, with head members on each of said studs to engage the recess wall of said pedestal.

* * * * *